United States Patent [19]
Bentivoglio

[11] Patent Number: 5,984,657
[45] Date of Patent: Nov. 16, 1999

[54] MULTI-LAYER BLOWN-FILM EXTRUSION DIE

[76] Inventor: Alfredo Bentivoglio, 2254 South Sheridan Way, Mississauga Ont., Canada, L5J 2M6

[21] Appl. No.: 08/803,593

[22] Filed: Jun. 5, 1997

[30] Foreign Application Priority Data

Feb. 27, 1996 [GB] United Kingdom .................... 9604127

[51] Int. Cl.⁶ ...................................................... B29C 47/26
[52] U.S. Cl. ....................... 425/133.1; 425/190; 425/380; 425/462; 425/467
[58] Field of Search ................................. 425/133.1, 190, 425/192 R, 380, 381, 466, 467, 462

[56] References Cited

U.S. PATENT DOCUMENTS

| | | | |
|---|---|---|---|
| 3,334,382 | 8/1967 | Lefevre | 425/133.1 |
| 3,947,173 | 3/1976 | Dougherty | 425/133.1 |
| 4,738,611 | 4/1988 | Briggs | 425/532 |
| 5,069,612 | 12/1991 | Teutsch et al. | 425/133.1 |
| 5,667,818 | 9/1997 | Guillemette | 425/133.1 |

*Primary Examiner*—Harold Pyon
*Assistant Examiner*—Joseph Leyson
*Attorney, Agent, or Firm*—Anthony Asquith & Co.

[57] ABSTRACT

This invention relates to a Multi-Layer Blown-Film Extrusion Die. An Extrusion Die is a key component of extrusion equipment, used in manufacture of Blown film for packaging industry. Although this Extrusion Die relates to production of five or more layers of blown films, it can also be used for production of lesser number of layers. While in the conventional outside fed die, melt was to be conveyed around the die in a fanning-out configuration, in this invention the polymer melt is split into two streams, before being fanned or spread around the circumference. Polymer melt enters several spiral or helical grooves prior to joining the gap that enjoins melt with other layers of the melt streams. The dimensions of spiral grooves and lands are carefully calculated, keeping in view relevant factors such as melt viscosity, shear sensitivity temperature and pressure requirements etc.

16 Claims, 7 Drawing Sheets

MULTI-LAYER BLOWN-FILM EXTRUSION DIE

This invention relates to the manufacture of plastic film by extrusion, and particularly to the manufacture of multi-layered film, by the co-extrusion of many layers of different materials of the film. The invention may be applied advantageously when the number of layers is, for example, five or more.

BACKGROUND TO THE INVENTION

It is a common practice, in the design of blown-film extrusion dies, when the film was of only one layer, to feed the polymer melt to the annular nozzle via a series of helical or spiral grooves. The helical grooves receive the melt from respective radial conduits, which convey the melt outwards from a central duct. The central duct lies on the axis of the die, i.e at the centre of the die.

This centre-fed-helical-grooves arrangement gave excellent results as far as evenness and quality of the film is concerned. (A key to economical production of plastic film is to ensure that the properties of the film are the same all the way around the circumference of the bubble of extruded material passing out through the annular nozzle.) The centre-fed-helical-groove arrangement is simple enough to engineer when the film is of only one layer. Two, three, four, etc, layers can also be accommodated with ease. In that case, the central ducts for conveying the separate materials for the layers are clustered around the axis of the die. Or, the several central ducts may be arranged annularly, i.e one inside another co-axially, around the axis.

But as the number of layers increases, it becomes more and more difficult for the designer to find room, on the axis of the die, for all the separate central ducts, and at the same time to ensure that all the spiral grooves of each of the layers receive an even amount of melt.

It is also a common practice among die designers, rather than arrange for the melt to be fed outwards from a central duct, then through the helical grooves and then to the annular nozzle, to arrange instead for the melt to be side-fed inwards into the annular nozzle from outside.

With an outside-fed, or side-fed, die, the problem of finding room for the melt-feed ducts on the inside of the die is eliminated, which is why outside-fed is preferred when the number of layers is high. But, with outside-fed, the designer has a more difficult task of ensuring that the melt is fed evenly all around the circumference of the die.

In the conventional outside-fed dies, the normal arrangement was for the melt to be conveyed around the die in a fanning-out configuration. That is to say, the designer arranged for the melt to be spread, from the melt-feed-port, directly right around the circumference.

GENERAL FEATURES OF THE INVENTION

In the invention, the polymer melt is first split into two streams, before being fanned or spread around the circumference.

It has been found that this splitting of the incoming melt flow into two, gives excellent results. The conventional arrangement of spreading the flow directly from the feed-port, i.e without splitting, could give acceptable results if everything remained constant, and to the specifications as originally envisaged. But sometimes, the operational parameters, such as materials, pressures, feed rates, temperatures, etc, may be changed, or the desire arises for them to be changed; and the conventional notion has been that even minor changes cannot be accommodated, because the change will throw the die into a zone of operation where consistency of the film is not so reliably achieved.

It has been found that splitting the incoming flow into two makes the die very tolerant of changes, when compared with not splitting the flow.

DETAILED DESCRIPTION OF PREFERRED EMBODIMENTS

By way of further explanation of the invention, exemplary embodiments of the invention will now be described with reference to the accompanying drawings, in which.

Figure 1:
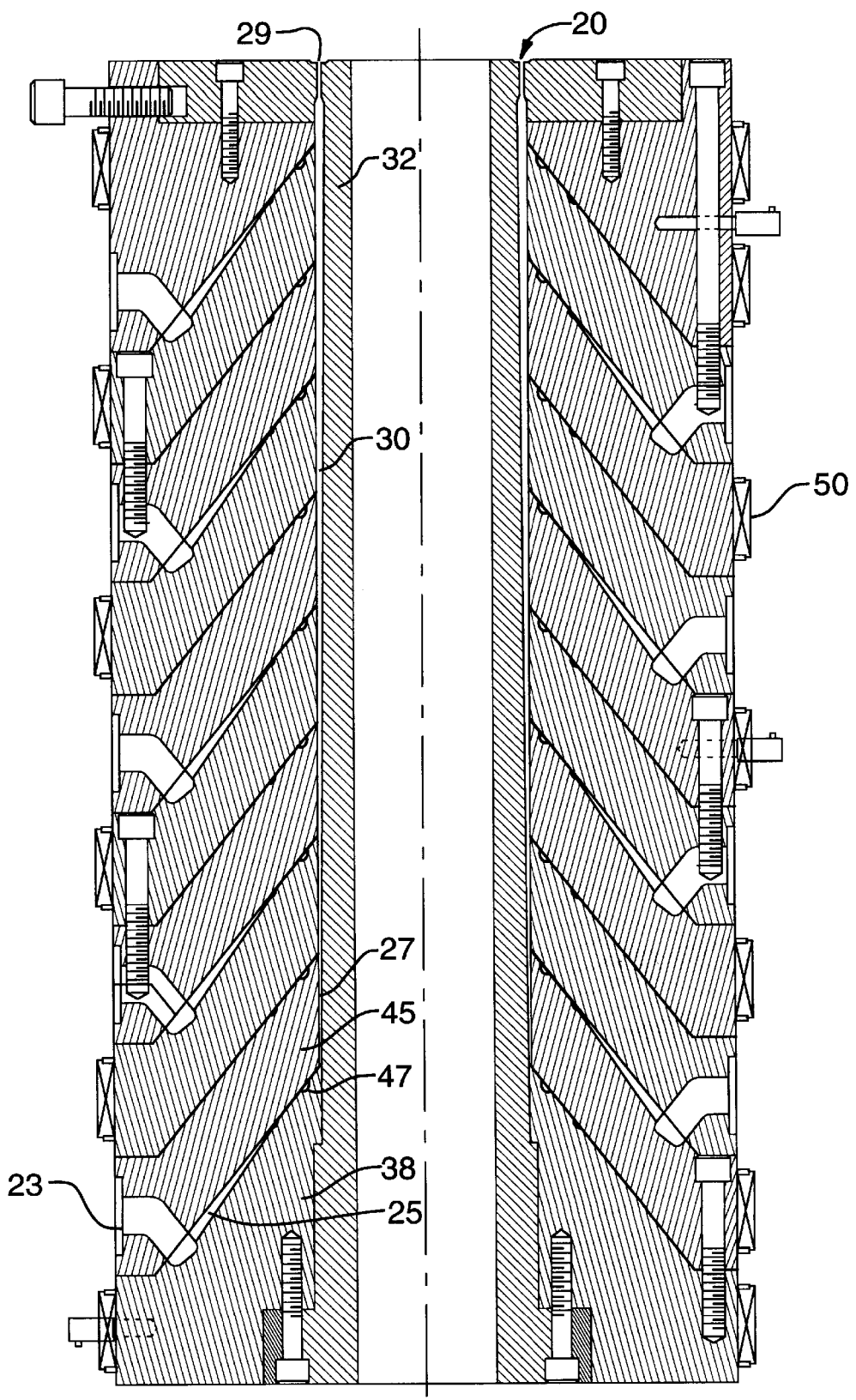
FIG. 1 is a cross-section of a nine-layer die, which embodies the invention.

The apparatuses shown in the accompanying drawings and described below are examples which embody the invention. It should be noted that the scope of the invention is defined by the accompanying claims, and not necessarily by specific features of exemplary embodiments.

The die 20 is a nine-layer die: that is to say, the die is suitable for the manufacture of blown plastic film of a nine-ply configuration.

The innermost ply is formed from liquid polymer melt which is fed into the die through a first-melt-feed-port 23. The melt spreads out from the port 23 around the circumference, flowing radially inwards and upwards, through the conically-annular gap 25, through the spiral or helical grooves. Still travelling radially inwards and upwards, the melt emerges into the cylindrical-annular gap 27. Thence, the melt travels upwards until it emerges from the die nozzle 29.

Polymer melts corresponding to the other plies in turn are fed into the die through the various other melt-feed-ports, as shown. The melts flow upwards, one surrounding the other, through the gradually widening annular gaps, as shown at 30, until the composite layer of liquid emerges from the annular nozzle 29, and forms a bubble. The liquid forming the bubble gradually solidifies into a tube of plastic film.

The pin 32 of the die is hollow, to accommodate the usual pipes (not shown) for supplying and extracting cooling air into and from the interior of the bubble.

A key to the performance of such a die is that the polymer melt is supplied into the gap 27 uniformly and evenly. The die would perform badly if the melt were to flow more rapidly on the north side of the annular gap 27 than on the south side. Ensuring circumferentially-equalised flow distribution around the annular gaps is of the essence in ensuring good die performance.

The problem of ensuring circumferential-equality of flow is a demanding one for the designer. The flow of melt entering the port 23, which is located at a single point on the circumference of the die, must be conveyed in such a way that, by the time the polymer melt emerges into the gap 27, it is flowing evenly and uniformly around the circumference of the gap 27.

Figure 3A:
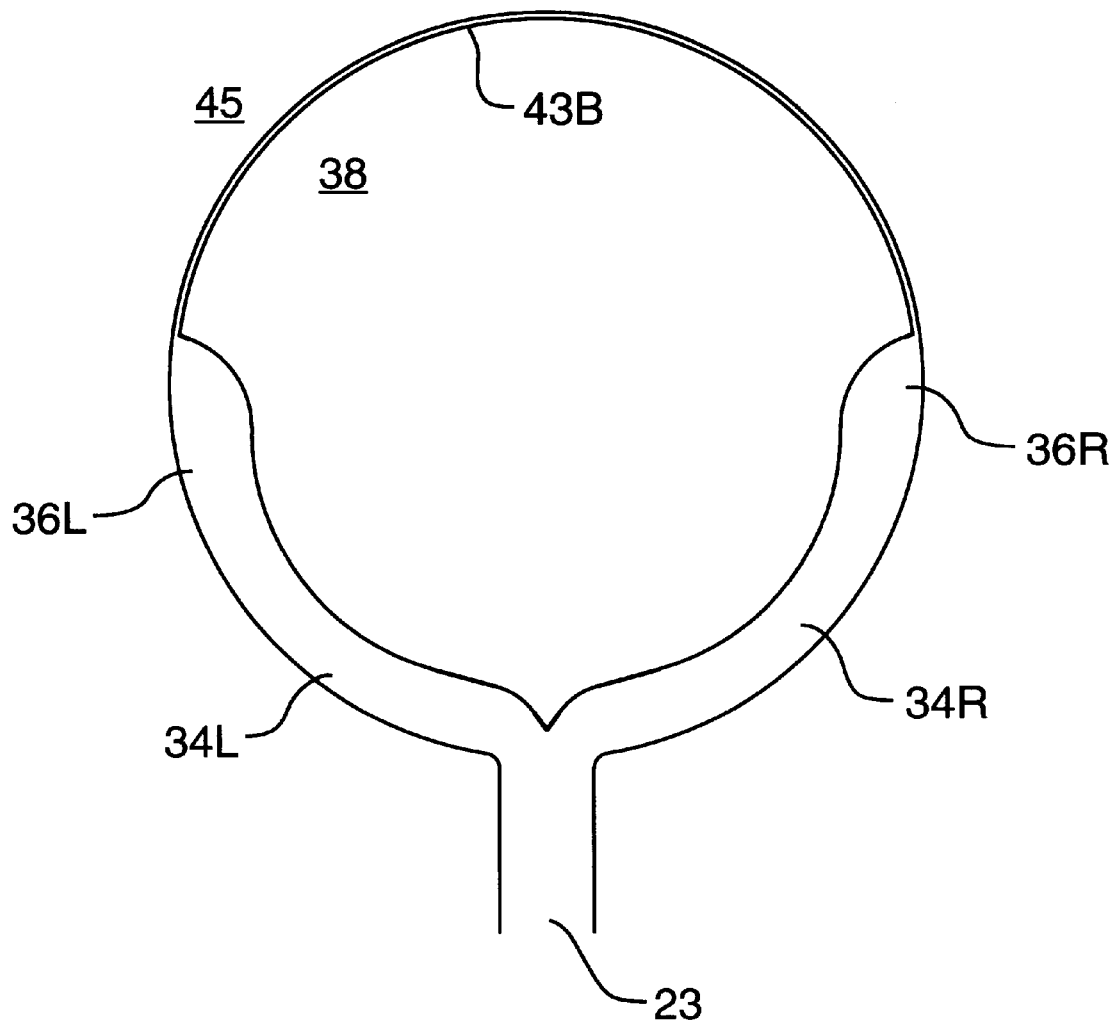
FIGS. 3a–3f are cross-sections of the die of FIG. 1, at the locations indicated on FIG. 2, the cross-sections being taken at right angles to the surface of the cone-shaped component of FIG. 2.

FIG. 3a shows the polymer melt entering at the first-melt-feed-port 23. The flow then enters the two-branch channel 34L,34R, where the flow divides into two equal halves. Careful and precise manufacturing is required to ensure the flow divides exactly into equal left and right melt-flows.

Figure 3B:
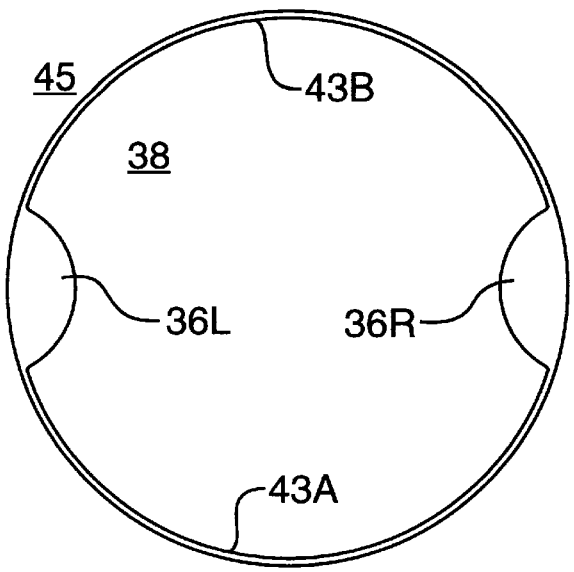
Figure 3C:
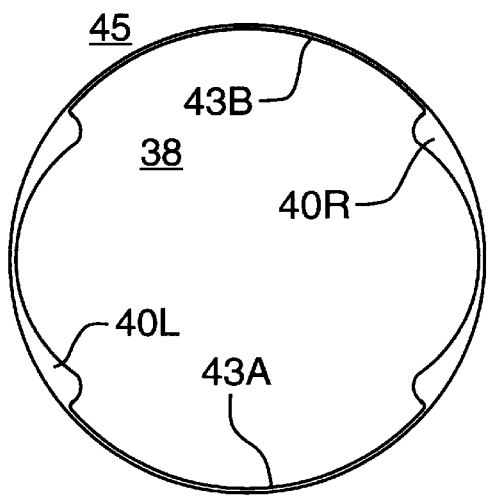

The left and right melt-flows then enter respectively into the appropriate ones of the transfer channels 36L,36R (FIGS. 3a,3b). From the transfer channels, the flows are caused to spread out circumferentially as they move radially inwards over the upper (conical) surface of the die component 38. FIG. 3c shows an early stage in this gradual moving-in, spreading-around, process.

Spread-channels 40L,40R receive the liquid from the transfer channels. Near the transfer channels 36L,36R, the spread channels 40L,40R are circumferentially-narrow, but radially-deep, so as to receive the liquid from the transfer-channels; the form of the spread-channels then gradually changes, to become circumferentially wide, but radially-shallow. This progressive change is illustrated by the changes between FIGS. 3b and 3c, between FIGS. 3c and 3d, and between FIGS. 3d and 3e.

Figure 3D:
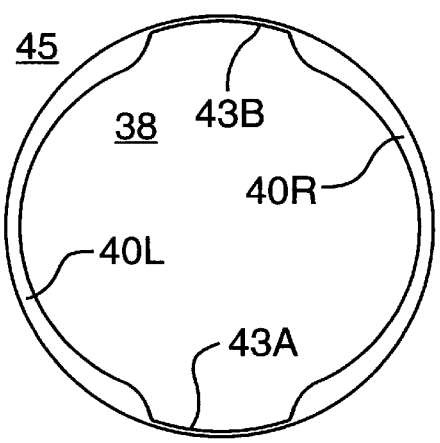
Figure 3E:
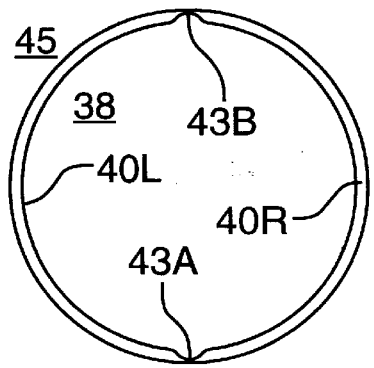
Figure 3F:
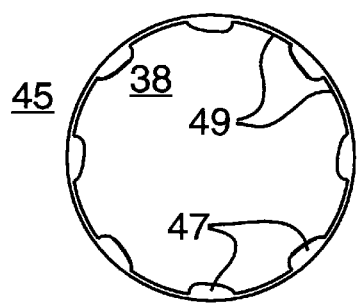

FIG. 3e shows the left and right spread-channels 40L,40R almost come together; or, in other words, the lands 43A,43B between the spread-channels have almost disappeared by the FIG. 3e stage. (It should be noted that the gaps between the lands and the mating component 45 are shown large for clarity, but the gaps are actually so small that polymer melt cannot, in substance, pass between the lands 43A,43B and the mating component 45.) In FIG. 3f, the spread-channels 40L,40R have completely merged, and the melt now enters the several spiral or helical grooves 47. The lands 49 between the grooves 47 are more clear of the mating component 45 than the lands 43A,43B, whereby the melt leaks out of the grooves, and up into cylindrically-annular gap 27. The dimensions of the spiral grooves 47 and the lands 49 therebetween are carefully calculated and manufactured to ensure the melt enters the gap 27 evenly.

The same manner of construction also applies in regard to the other eight layers. In each case, polymer melt is fed into the die from an outside source through the appropriate melt-feed-port. The layers are not all equal; the materials and their flow characteristics can differ considerably, in that one material may have a viscosity that is much more sensitive to temperature than another material, or the film may require a greater thickness of one material than another, or some materials may need a layer of adhesive between them, and of course the more expensive of the plastic materials should be used more sparingly.

The rheologies of polymeric materials vary a great deal, depending on their molecular and branching properties. Of the variable parameters, attention should be given to temperature sensitivity and shear rate dependency of polymer flow. Depending on the viscosity of the melt, when a melt is flowing in a conduit or channel, the faster moving portion of the flow tends to be in the centre (as with any moving liquid). The faster-moving liquid tends to be the liquid that is thinnest, i.e the least viscous. It follows that since the liquid in the centre of the conduit tends to be thinner, the centre liquid is therefore hotter, than the liquid towards the sides or walls of the conduit. As a result, a conduit or channel for conveying a liquid with a high viscosity/temperature dependence can, unless it is very carefully designed, in fact serve as quite an efficient temperature separator—in which the liquid near the centre is considerably and consistently hotter than the liquid near the walls. The slower, cooler melt will then remain in the die for a longer residence time, which leads to variations in the degree of curing of the melt as the melt passes into the bubble, which generally adversely affects film quality (for example, as inconsistencies in the film thickness). The more sensitive the viscosity of the melt is to its temperature, the more the conduit tends to act as a thermal separator, i.e to separate the flowing melt into temperature-separate layers.

Figure 4B:
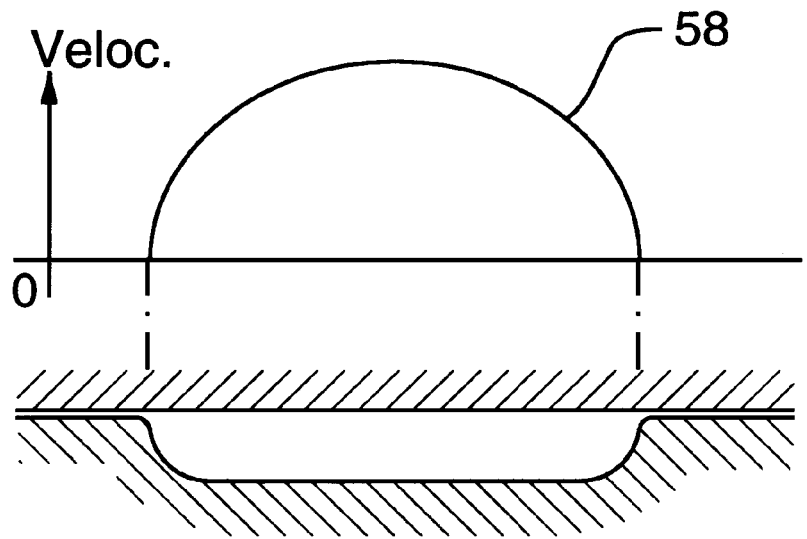
FIGS. 4a, 4b are diagrams indicating flow velocity profiles of polymer melt flowing in the die of FIG. 1.
Figure 4A:
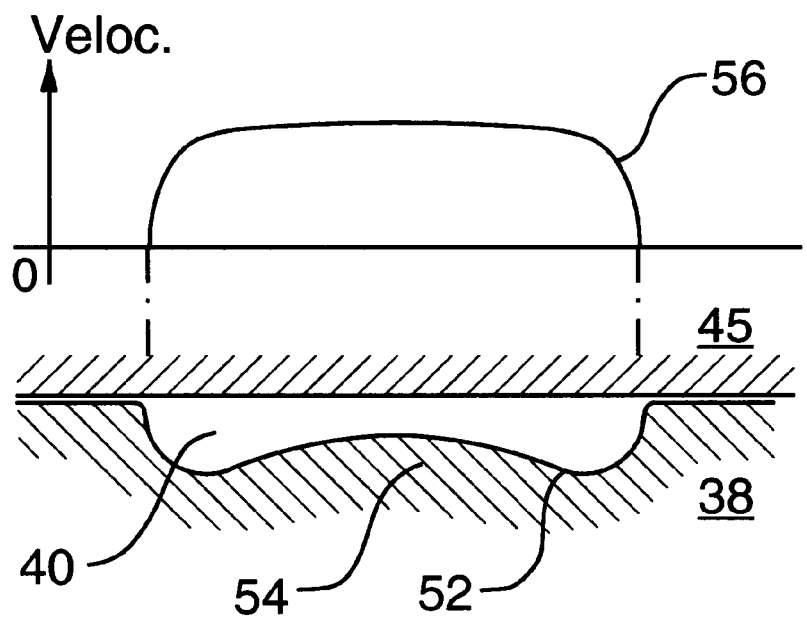

It is of course customary to provide heaters to heat the die components, as shown at 50 (FIG. 1), in order to minimise this problem. Besides that, in the embodiment as herein described, as shown particularly in FIG. 3c, the spread-channels 40L,40R are so shaped as to maintain a favourable velocity and distribution profile. FIGS. 4a and 4b show the effect of raising a bump 54 in the floor 52 of the spread-channels towards the middle zone thereof. The velocity profiles 56,58 indicate respectively the variation of velocity, and hence, more or less, of temperature, when the floor is or is not raised.

As the spread-channels spread around the circumference, the channels become so narrow, radially, that differentially raising the floor in the middle zone of the spread-channel no longer has an effect (FIGS. 3d and 3e).

Figure 5:
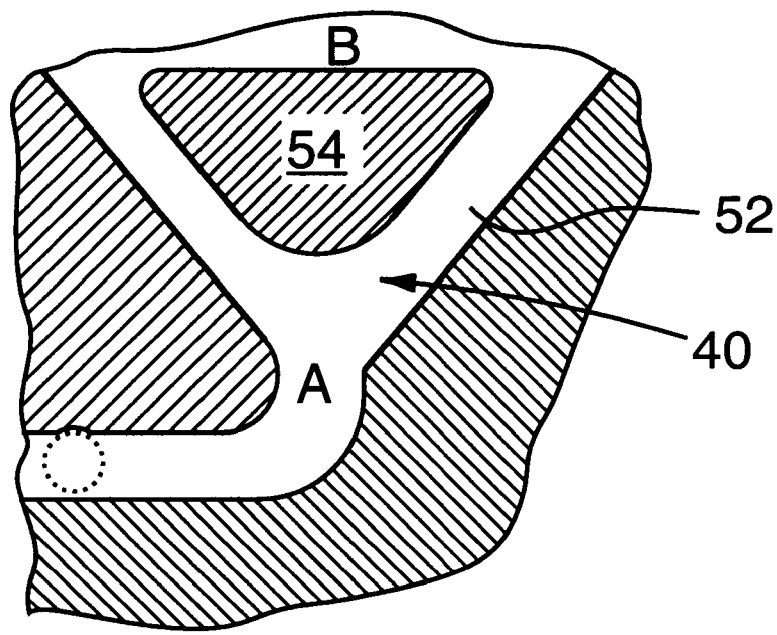
FIG. 5 is a diagrammatic or projected side-view of an area of the cone-shaped component of FIG. 2.
Figure 6:
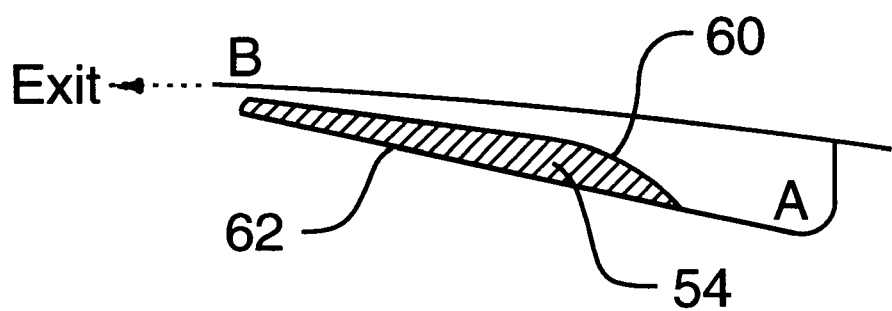
FIG. 6 is a section on line 6—6 of FIG. 5.

FIGS. 5 and 6 show further details of the bumps 54 in the spread-channels. In FIG. 5, the conical surface is projected flat. The bump 54 protrudes upwards from the floor 52 of the spread channel 40. FIG. 6 shows the profile 60 of the bump 54, superimposed on the profile 62 of the areas surrounding the bump. It will be understood that the outline of the bump is not distinct, but is bulbous and blends smoothly into the floor of the channel.

In determining the exact shape of the bump in the spread-channel, the designer is concerned with achieving an even flow and velocity distribution of the melt as it enters the spiral grooves. The bump is present in the floor of the spread-channel, as mentioned, as a measure against the tendency the spread-channel would have, if it had a "level" floor, to act as a thermal separator. The more the viscosity of the melt varies with temperature, the more the melt tends to become stratified into layers of different temperatures—the hottest, thinnest, and fastest-flowing layers predominating in the centre of the channel, away from the walls, where flow resistance is least—and the more care has to be taken to prevent that. The bump 54 causes a graded restriction in the centre of the channel, the aim being that at all points around the spread-channel, the melt experiences a constant resistance to flow. Within limits, i.e to some extent, it does not matter what the flow resistance is, so long as the melt entering the spiral grooves has all encountered the same flow resistance.

Figure 7:
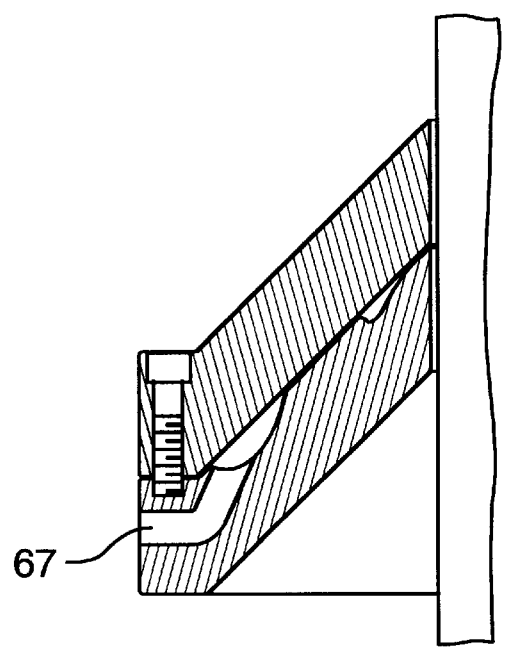
FIG. 7 is a cross-section of some of the components of another die.

The melt-feed-port for receiving the melt in from outside the die, is, as shown at 23 in FIG. 1, located in the conical component above the conical component that defines the various channels and profiles relating to the melt that enters through that port. Sometimes, it is preferable for the melt-feed-port to be in that same conical component, and this option is shown in FIG. 7. In FIG. 7, it will be noted that the port 67 is now rather more awkward to machine (and to polish), but the extra flexibility in design is sometimes preferred.

Figure 8:
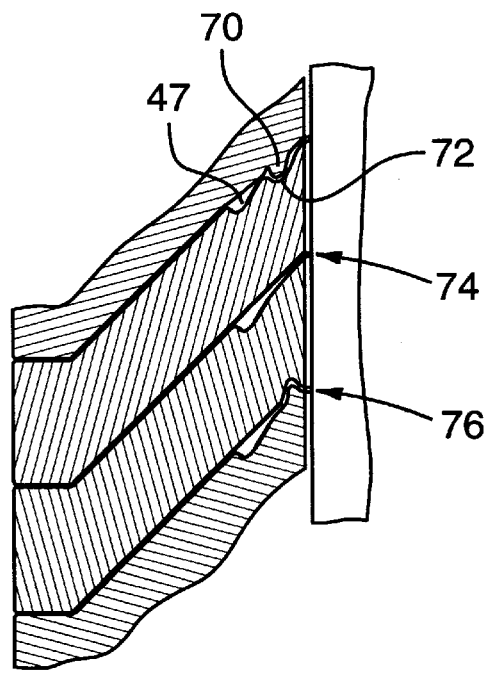
FIG. 8 is a cross-section of some of the components of another die.

FIG. 8 shows the provision of a bar or ridge 70 formed in the material of one of the die components, which co-operates with a complementary groove 72 formed in the other component. This bar-and-groove arrangement has the effect of causing some degree of roll-over of the melt flowing therethrough. The purpose of this is to cause the portion of the liquid melt that lies closest to the walls, i.e the melt at the edges of the flow-path of the melt, to move into the centre of the flow-path. Again, this is a measure aimed at reducing the tendency of flow conduits to produce thermal stratification in the moving melt. The aim is to cause the flowing melt to roll over itself, but the profiles of the bar and groove must be carefully finished so as not to produce hang-ups in the flow.

Not all the layers require such intense precautions to be taken against stratification, and the bar-and-groove arrangement can be omitted in respect of certain of the layers, as shown at 74.

Sometimes, it will be preferred to cut the groove in the upper component, and form the ridge in the lower component, as shown at 76.

It is contemplated, in the invention, that each layer may be supplied through two or more melt-feed ports. However, the problem of equalising the flow between the two or more feed-ports would then arise, and the preference is that the layer is fed from just one feed-port.

As described, the melt-feed-ports are all on the outside of the die; however, it is possible to arrange that a small number of the inner layers of polymer might be fed from the inside or bottom of the die. Such an arrangement is contemplated in the invention, but the preference is that all the layers are fed from the outside.

Figure 2:
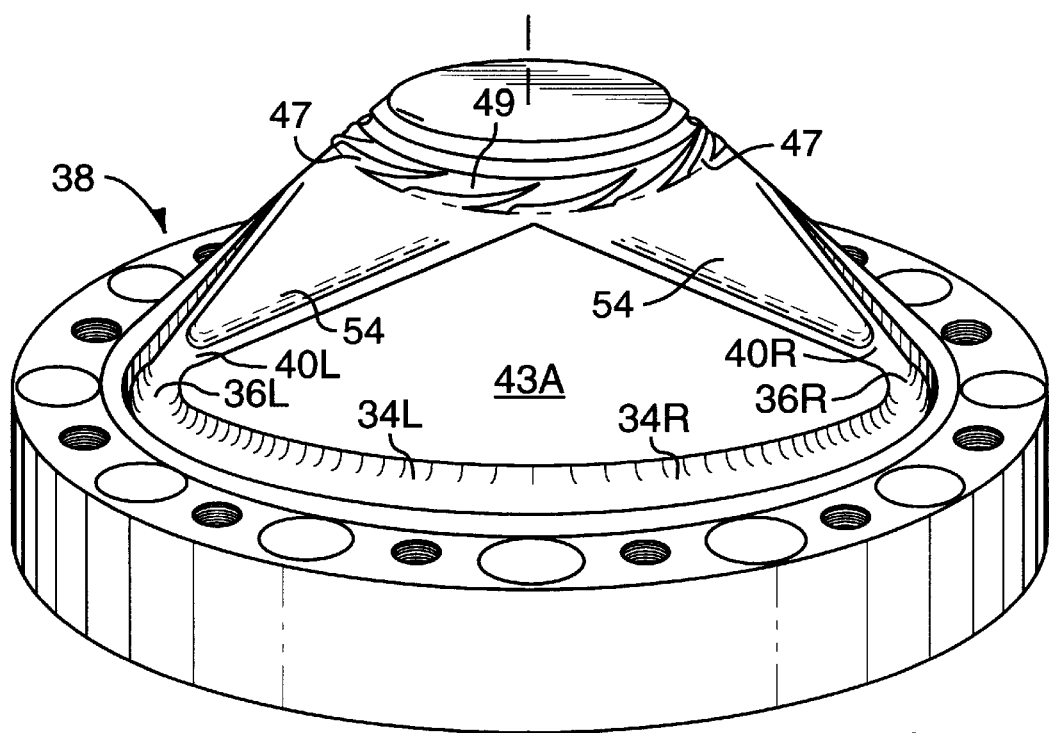
FIG. 2 is a pictorial view of a cone-shaped component of the die of FIG. 1.
Figure 2A:
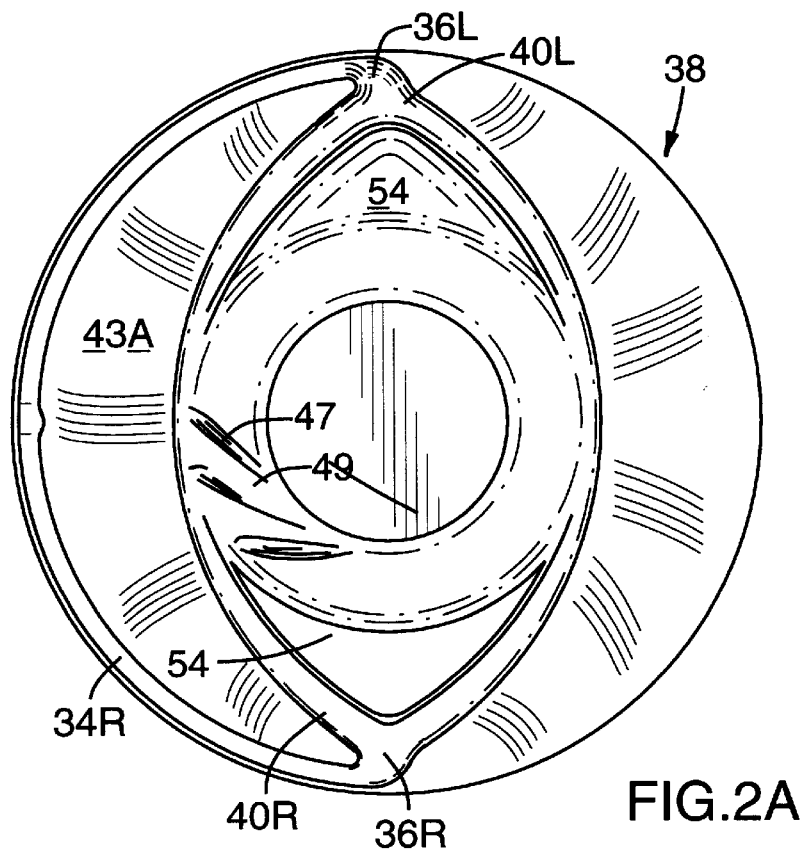
FIG. 2a is a plan view of a portion of the component shown in FIG. 2.

A visual feature of the embodiment as described lies in the shape of the land 43A between the spread-channels 40L, 40R, which is, in the embodiment described, triangular, or inverted heart-shaped (looking directly at the land from the side of the die—this aspect of the shape is not apparent in FIG. 2a). The bumps 54 are also triangular.

I claim:

1. Apparatus for producing multi-ply blown plastic film, by co-extrusion, wherein:

the apparatus includes inner and outer walls that define an annular nozzle, through which liquid melt is ejected to form a bubble;

the inner and outer walls also define an axially-long annular pre-nozzle chamber, through which the melt is conveyed prior to emergence from the nozzle;

the apparatus includes a set of die-components, which are arranged as a stack, and fixedly secured together;

the apparatus includes respective systems of melt-conveying-channels in respect of each ply, for promoting a circumferentially-even distribution of the flow of melt in the annular pre-nozzle chamber;

each system of channels is provided between adjacent upper and lower die-components of the stack;

each channel in the system has a roof formed in the upper die-component and a floor formed in the lower die-component, the channels being configured as machined indentations in at least one of the floor and roof;

in respect of each ply:

the system of channels for that ply includes a respective set of helical grooves, which are so arranged that the melt passes through the helical grooves before entering the annular pre-nozzle chamber;

the melt for that ply is fed in through a respective entry port;

the entry port is at a radially outermost location with respect to the system of channels, and the system of channels is arranged for conveying the melt to the annular pre-nozzle chamber in a radially-inwards directional progression, towards the annular pre-nozzle chamber;

the system of channels for that ply includes a left transfer-channel and a right transfer-channel, and a left spreader-channel and a right spreader-channel;

the left and right spreader-channels are so arranged as to receive melt respectively from the left and right transfer-channels, and to convey the melt therefrom evenly to the helical grooves of that ply;

the left and right transfer-channels are deep and narrow, and the cross-sectional configurations of the spreader-channels are correspondingly deep and narrow in regions of the spreader-channels that lie adjacent to the transfer-channels;

in respect of each spreader-channel, the spreader-channel is so formed as to become gradually and progressively relatively shallower and circumferentially wider, as measured normal to the direction in which the melt flows from the respective transfer-channel to the helical-grooves;

the helical-grooves have respective entry-mouths, and the spreader-channels include respective marginal portions, being the portions from which the melt passes directly to the entry-mouths of the helical grooves, and the marginal portions form a complete encirclement of the entry-mouths of the helical-grooves;

the left spreader-channel and left transfer-channel are identical to the right spreader-channel and right transfer-channel, each spreader-channel providing half the said complete encirclement.

2. Apparatus of claim 1, wherein, in respect of each spreader-channel:

the depth of the spreader-channel is the distance between the floor and the roof of the spreader-channel, as taken at a cross-section of the spreader-channel;

a first cross-section is taken near the transfer-channel, where the spreader-channel is relatively deep and narrow, and subsequent cross-sections are taken nearer to the helical grooves;

the cross-sections are taken in planes normal to the direction of the flow of melt through the spreader-channel from the respective transfer-channel to the helical-grooves;

the die-components are so machined that the depth of the spreader-channel at any one cross-section varies across the width of the spreader-channel;

the die-components are so machined that the manner of variation of the depth across the width of the spreader-channel is different at the subsequent cross-sections;

the die-components are so machined that, at the first cross-section, the manner of variation of the depth across the width of the spreader-channel is such that the spreader-channel is deeper towards the sides of the cross-section, and shallower in the middle of the cross-section.

3. Apparatus of claim 2, wherein the die components are so machined that, at the subsequent cross-sections, the difference between the deep depth at the sides and the shallow depth in the middle is present, but is less than at the first cross-section.

4. Apparatus of claim 3, wherein the floor of the spreader-channel is machined with a central bump, which is more pronounced at the first cross-section, and becomes less pronounced at the subsequent cross-sections.

5. Apparatus of claim 4, wherein the bump is so machined as to blend smoothly into the general configuration of the spreader-channel, whereby the flow of melt in the spreader-channel is steady and without hang-ups.

6. Apparatus of claim 1, wherein, in respect of at least some of the plies:
   the arrangement of the apparatus is such that only one entry port is provided for that ply;
   the apparatus includes left and right branch-channels, which branch from that one entry port;
   the branch-channels are in liquid-flow communication with the respective transfer-channels, and are so arranged as to divide the flow from the entry port substantially equally between the transfer-channels.

7. Apparatus of claim 6, wherein the branch-channels are configured as machined indentations in at least one of the floor and roof.

8. Apparatus of claim 7, wherein the left and right branch channels, the left and right transfer-channels, and the left and right spreader-channels, are substantially identical.

9. Apparatus of claim 1, wherein the upper die-component of one of the plies doubles as the lower die-component of the adjacent ply below.

10. Apparatus of claim 1, wherein:
    in respect of each ply, the upper die-component thereof comprises a first unitary disc-shaped plate of metal, and the lower die-component comprises a second unitary disc-shaped plate of metal;
    and the stack of die-components of the apparatus comprises a stack of the disc-shaped plates.

11. Apparatus of claim 10, wherein the disc-shaped plates are all conically-dished, and each plate has an upper male-conical surface and a lower female-conical surface.

12. Apparatus of claim 11, wherein:
    the apparatus is so arranged that the upper male-conical surface includes the floors of the channels, and the lower female-conical surface includes the roofs of the channels;
    the channels are machined into the upper male surface, and the lower female surface is plain.

13. Apparatus of claim 1, wherein the apparatus is arranged to produce a film having at least five plies.

14. Apparatus of claim 1, wherein, in respect of at least some of the plies, a region of the die-components that lies between the helical-grooves and the pre-nozzle chamber is provided with a rollover-ridge, which is so configured as to be effective to cause the flow of melt emanating from the helical-grooves to be inverted;
    whereby a first portion of the flow at a location near one of the walls of the die-components is moved away from the wall, and a second portion of the flow at a location away from the walls is moved toward the wall.

15. Apparatus of claim 5, wherein:
    in respect of at least some of the plies:
    the arrangement of the apparatus is such that only one entry port is provided for that ply;
    the apparatus includes left and right branch-channels, which branch from that one entry port;
    the branch-channels are in liquid-flow communication with the respective transfer-channels, and are so arranged as to divide the flow from the entry port substantially equally between the transfer-channels;
    the branch-channels are configured as machined indentations in at least one of the floor and roof;
    the left and right branch channels, the left and right transfer-channels, and the left and right spreader-channels, are substantially identical;
    the upper die-component of one of the plies doubles as the lower die-component of the adjacent ply below;
    in respect of each ply, the upper die-component thereof comprises a first unitary disc-shaped plate of metal, and the lower die-component comprises a second unitary disc-shaped plate of metal;
    the stack of die-components of the apparatus comprises a stack of the disc-shaped plates;
    the disc-shaped plates are all conically-dished, and each plate has an upper male-conical surface and a lower female-conical surface;
    the apparatus is so arranged that the upper male-conical surface includes the floors of the channels, and the lower female-conical surface includes the roofs of the channels;
    the channels are machined into the upper male surface, and the lower female surface is plain.

16. Apparatus of claim 1, wherein:
    only at the said marginal portions do the spreader-channels come together to form the said complete encirclement;
    upstream of the said marginal portions, the spreader-channels do not form a complete encirclement, but are defined between side-walls of the spreader-channels;
    outside the side-walls of the spreader-channels, the roof of the upper die-component and the floor of the lower-die component lie in such close proximity that substantially no melt can leak therebetween.

* * * * *